Dec. 31, 1957  W. G. HOELSCHER  2,817,982
SELF-EQUALIZING HEAD CLAMPING MECHANISM
Filed March 12, 1956  4 Sheets-Sheet 1
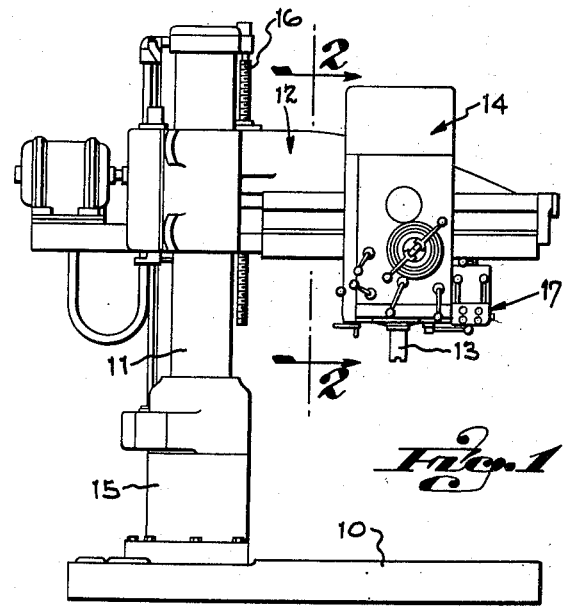
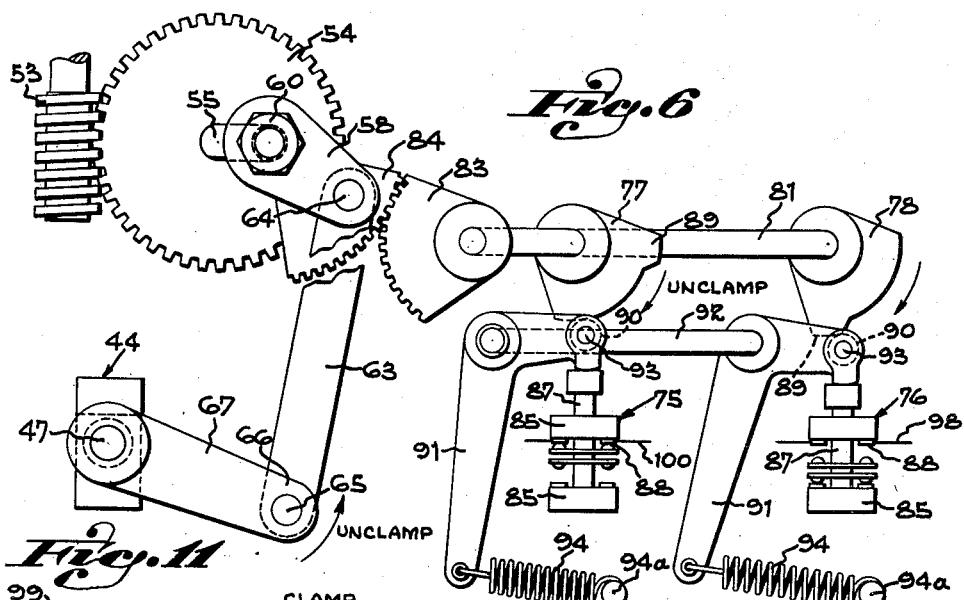
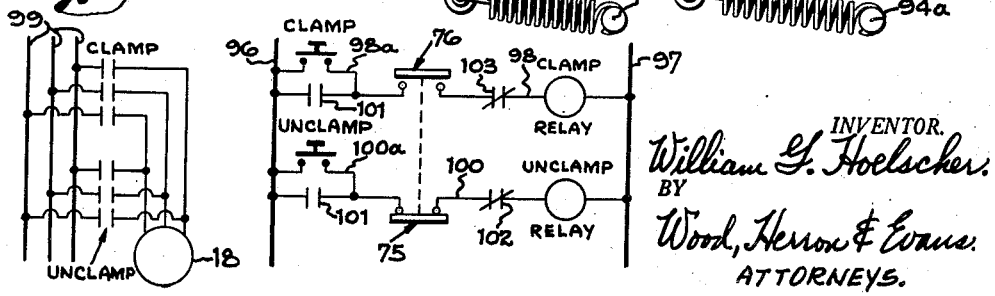

Dec. 31, 1957 W. G. HOELSCHER 2,817,982
SELF-EQUALIZING HEAD CLAMPING MECHANISM
Filed March 12, 1956 4 Sheets-Sheet 2
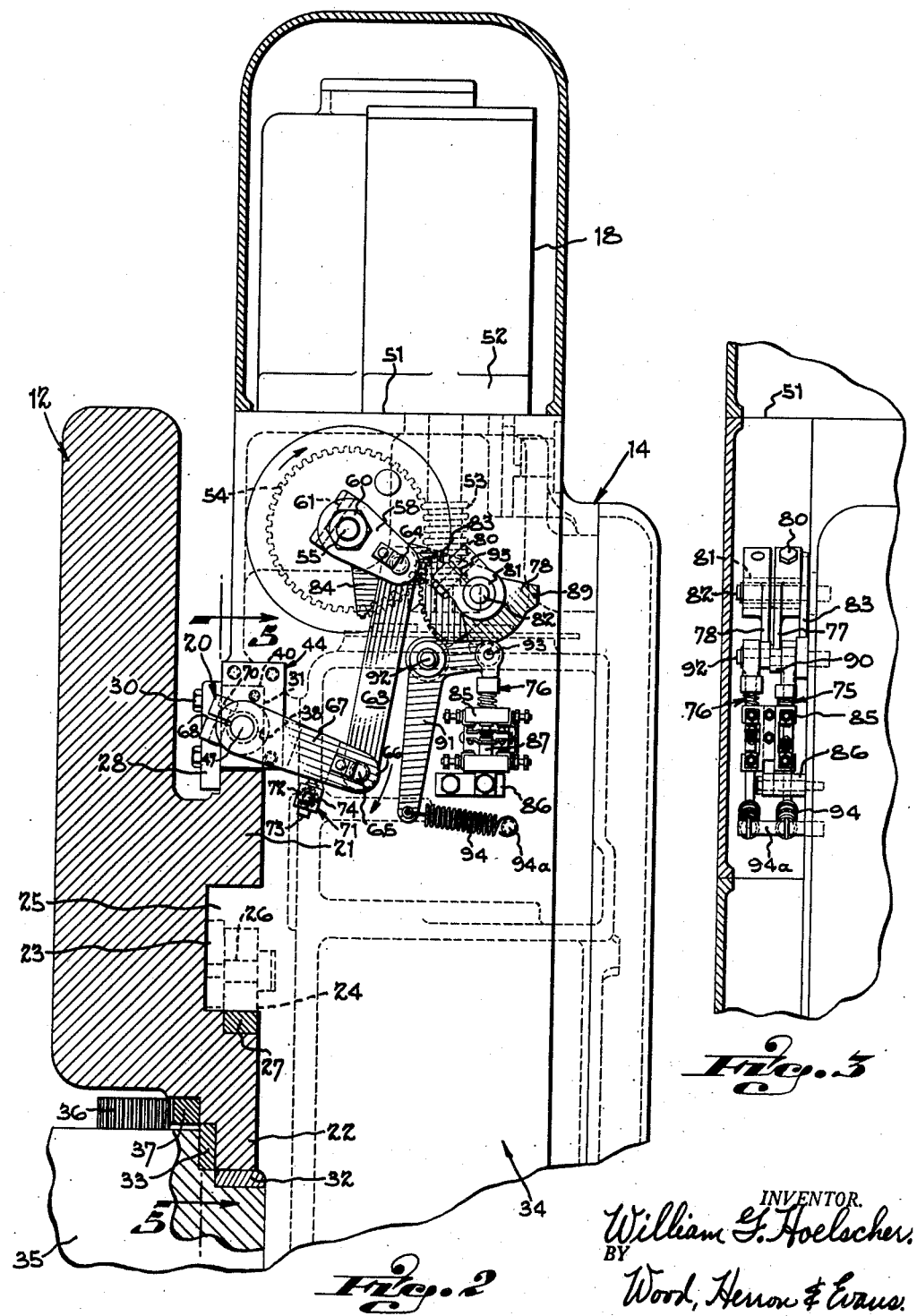

Dec. 31, 1957  W. G. HOELSCHER  2,817,982
SELF-EQUALIZING HEAD CLAMPING MECHANISM
Filed March 12, 1956  4 Sheets-Sheet 3

INVENTOR.
William G. Hoelscher.
BY Wood, Herron & Evans.
ATTORNEYS.

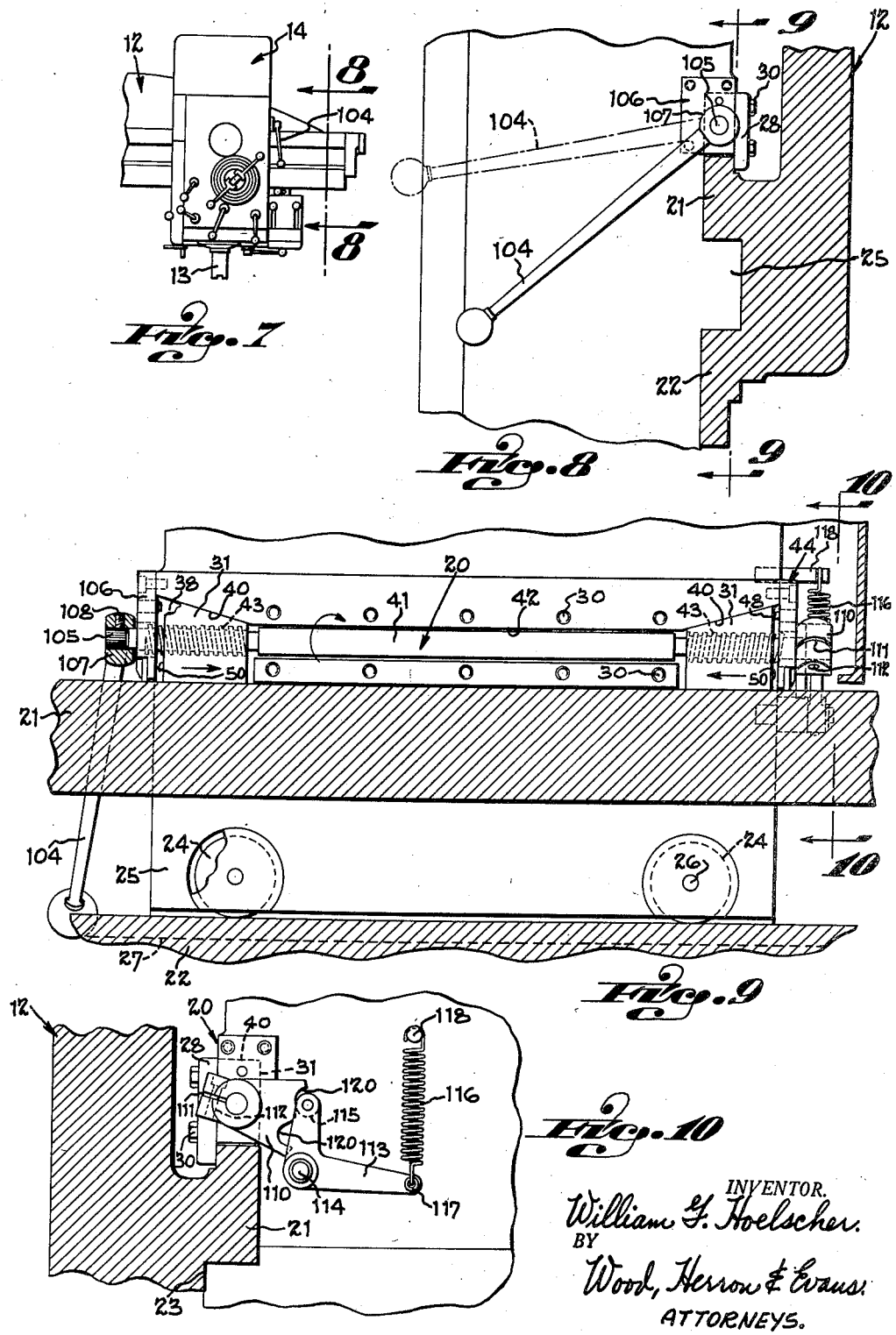

United States Patent Office 2,817,982
Patented Dec. 31, 1957.

2,817,982

SELF-EQUALIZING HEAD CLAMPING MECHANISM

William G. Hoelscher, Cincinnati, Ohio, assignor to The American Tool Works Company, Cincinnati, Ohio, a corporation of Ohio Application March 12, 1956, Serial No. 571,032

10 Claims. (Cl. 77—28)

This invention relates to machine tools, such as radial drills and the like, having a head which is moved along an arm relative to a work supporting base, thereby to locate the head and its rotating spindle relative to the work.

One of the principal objectives of the invention has been to provide a simple rugged mechanism which clamps the head rigidly to the arm while sustaining it precisely in selected position with its spindle accurately centered to a point on the work which is mounted on the base.

A further objective has been to create a structure which preserves the angular disposition of the spindle axis relative to the plane of the base whether the head is clamped or unclamped.

According to the radial drill which has been selected to illustrate the principles of the invention, the arm is movable radially above a work-supporting base and the drill head is movable lineally along the arm. In setting up the tool, the operator swings the arm radially and shifts the head along the arm to locate the spindle in precise alignment with the center of the hole which is to be machined in the work. The head is then clamped to the arm and the rotating spindle is fed downwardly, causing its tool to drill or machine the hole. To obtain accurate machining, the spindle axis must reside at a precise angle to the work-supporting base and this angular relationship must be preserved whether the head is clamped or unclamped. If the work is such that the holes are not at right angles to the base or are angularly related to each other, then the work is mounted upon an adjustable fixture carried by the base so that the work faces can be angularly adjusted with respect to the axis of the spindle.

The invention contemplates a simple clamping structure wherein wedging shoes, tapered lengthwise in relatively opposed directions, are slidably confined in opposite side portions of the head and have flat bearing surfaces slidably engaging a flat parallel clamp surface extending along the top of the arm. The shoes are interconnected through a rock shaft having right and left hand threads, such that the shoes are drawn toward one another in response to partial rotation of the shaft to create a wedging clamp action between the arm and head.

A particular advantage of this principle is that the wedging shoes and their rock shaft, as a unit, are free to float for a limited distance relative to the head in the direction of the shaft axis. This eliminates any tendency for the clamping shoes to develop unequal wedging resistance, and consequent misalignment of the spindle or displacement of the head along the arm, as the shoes are drawn toward one another into clamping engagement. Should one shoe develop a greater wedging resistance to clamping motion than the other shoe, the floating action causes the first shoe to stop and imparts greater motion to the opposed shoe until the resistance of both shoes again becomes equal. Although the structure is simple and rugged, this floating arrangement creates a balanced clamping action which preserves the original alignment of the spindle and eliminates any tendency for the head to shift, even minutely, as it is clamped to the arm at selected position.

The floating wedging structure has the further advantage of developing high clamping pressure with a minimum of applied force, and of providing a self-locking action when fully clamped. The self-locking action is brought about by the screw threaded engagement of the rock shaft, and the screw threads, coacting with the wedging shoes, create a smooth clamping action and an extremely high clamping pressure with relatively little frictional loss.

In the preferred embodiment of the invention, the arm has an intermediate load bearing surface below the top clamp surface, and a bottom bearing surface opposing the top clamp surface. The head is carried, preferably by rollers tracking upon the intermediate load bearing surface, and is stabilized laterally by bearing surfaces on opposite sides of the arm, slidably engaging corresponding surfaces of the head. The bearing surfaces are precisely fitted so that the head is slidably sustained with its spindle accurately aligned, both in the plane of lineal motion and at right angles to it.

The head includes adjustable taper gibs engaging the bottom bearing surface of the arm, the gibs are adjusted longitudinally to provide a precise running fit with the bottom bearing surfaces, while the weight load is carried by the rollers which track upon the intermediate bearing surface above the gibs. The gibs thus guide the head and coact with the side bearing surfaces to preserve the alignment of the spindle axis as the head is shifted along the arm upon the anti-friction rollers.

As the wedging shoes are pulled toward one another, the wedging force lifts the head upwardly under equalized pressure and forces the adjustment gibs against the bottom bearing surface of the arm. This takes up the slight running clearance of the gibs and lifts the rollers of the head from the intermediate tracking surface. Accordingly, the head is clamped firmly by the pressure reacting against the gibs to preserve the original alignment of the head. The alignment in the plane traverse to the arm is preserved by the side bearing surfaces at all times. During the drilling operation, the upward thrust of the spindle reacts directly against the gibs to eliminate any tendency to misalign the spindle.

A further object of the invention has been to provide a power-operated linkage which takes advantage of the self-locking action of the clamping mechanism to clamp the head firmly under uniform pre-determined pressure upon each clamping cycle.

This aspect of the invention is embodied in a motor-driven linkage having pilot switches interconnected in a reversing circuit which is manually controlled by push buttons. When the clamping button is depressed, the pilot switches establish a holding circuit to keep the motor in clamping direction until the switches are shifted by the linkage to a position which corresponds to a pre-determined clamping pressure of the shoes. At this point, the pilot switches deenergize the motor and the self-locking action holds the head firmly clamped until the unclamping cycle is initiated.

When the unclamping button is depressed, the pilot switches keep the motor energized in unclamping direction until the actuating linkage reaches a second position, at which point they deenergize the motor and re-establish the circuit for motor drive in the clamping direction upon the next actuation of the clamp button. This apparatus therefore provides rapid clamping or unclamping cycles in a positive manner and creates the required clamping pressure without over-loading or straining the linkage by deenergizing the motor at pre-determined limits before over-loading occurs.

The various features of the invention are brought out in detail in the following description in conjunction with the drawings.

In the drawings:

Figure 1 is a side elevation of a typical radial drill equipped with the power operated head clamping mechanism of the invention.

Figure 2 is an enlarged fragmentary sectional view taken along line 2—2 of Figure 1 with the side cover of the head removed to show the clamp actuating linkage.

Figure 3 is a fragmentary front elevation projected from Figure 2, further illustrating the linkage.

Figure 6 is a diagrammatic perspective view showing the driving system, clamp linkage and switch operating cams which regulate the clamping motor.

Figure 7 is a fragmentary view of a radial drill equipped with the present head clamp but utilizing a hand lever in place of the power drive.

Figure 8 is an enlarged fragmentary sectional view taken along line 8—8 of Figure 7, showing the hand operated clamping lever in its relationship to the head.

Figure 9 is a sectional view taken along line 9—9 of Figure 8, further illustrating the hand operated clamping mechanism.

Figure 10 is a fragmentary view taken along line 10—10 of Figure 9, showing the detent for locking the mechanism in clamped or unclamped position.

Figure 11 is a simplified diagram of the electrical circuit for operating the clamp motor.

*General arrangement*

Figure 4:
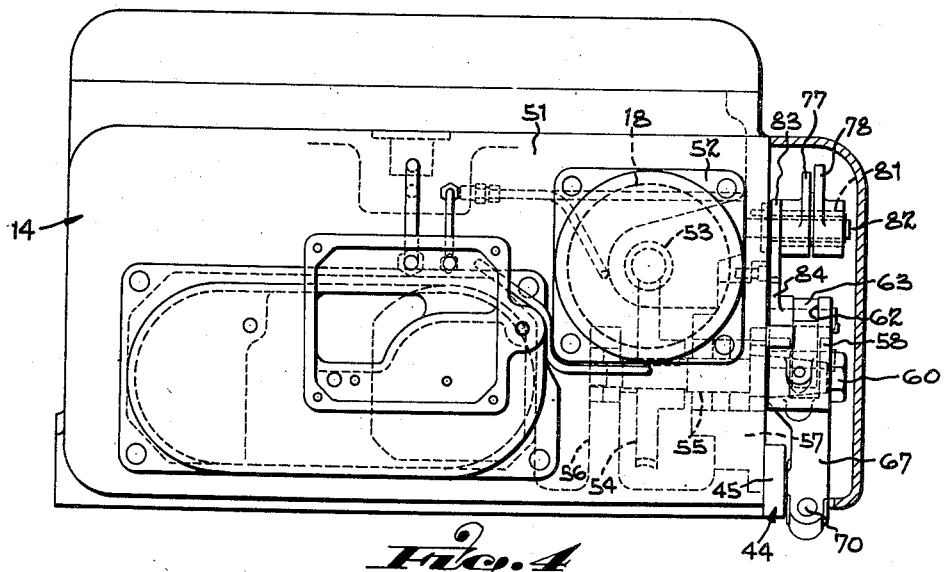
Figure 4 is a top plan view of a portion of the head with the top cover removed to show the arrangement of the power driving system for the clamping structure.

Referring to the drawings, the machine shown in Figure 1 represents a radial drill which has been selected to best illustrate the utility and principles of the invention. It will be understood that the clamping mechanism is intended for machine tools of all kinds which embody a head movable lineally along an arm and arranged to be clamped in a fixed position with its spindle located at a selected point and at a precise angle to the plane of the work surface. The mechanism shown in Figures 1 to 6 comprises a power operated clamping mechanism and that shown in Figures 7 to 10 involves the same clamping principles but is directed to a modification in which the mechanism is operated by a hand lever, as explained in detail later.

The radial drill, shown in Figure 1, includes a base 10 upon which the work is mounted, and the base includes a vertical column 11 supporting an arm 12. The arm is movable radially above the base so as to locate the spindle 13 of the head 14 in axial alignment with the hole centers of the work. In the machine illustrated, the column is rotatably mounted upon a stump 15 bolted to the base and the arm is slidably keyed to the column and may be raised or lowered by means of an elevating screw 16 suspended from the upper end of the column. A power driven nut (not shown) is threaded on the screw to raise or lower the arm. The head 14 is shifted lineally along the arm by means of a pinion journalled in the head and meshing with a rack extending along the arm, as described later.

In operating the drill, the work is mounted either directly upon the base 10 or upon a suitable positioning fixture on the base and the head is shifted to the required elevation above the work by operating the elevating mechanism. The spindle 13 is then aligned with the hole center by swinging the arm radially and by shifting the head lineally along the arm. When the desired position is obtained, the column and arm may be clamped in position by column and arm clamps (not shown), and the head is clamped to the arm by the clamping mechanism of this invention.

The power operated head clamp is controlled by push buttons mounted in a control box 17 at one side of the head as indicated in Figure 1. Actuation of the clamp button energizes a reversible motor 18 (Figure 2) which causes the clamping mechanism of the head to grip the arm. The head clamping mechanism is indicated generally at 20 in Figures 2 and 5. When the unclamped button is depressed, the motor is energized in the opposite direction to release the head clamp and allow the head to be shifted along the arm.

The electrical control system for the head clamp is described later with reference to the diagram of Figure 11. It is to be noted that the control box 17 provides a centralized control station for operating the column and arm clamps as well as the head clamp. This complete apparatus is disclosed in the co-pending application of William G. Hoelscher, Serial No. 603,001 filed on August 9, 1956.

It will be understood that to obtain precise machining of the holes, it is necessary to guide the head along the arm while maintaining the spindle accurately in a fixed axis relative to the base and work. As explained in detail later, the arm is provided with parallel guide ways and the head includes slide bearing surfaces precisely fitting the bearing surfaces of the arm guide ways. The head clamping mechanism includes opposed clamping shoes providing an equalized wedging action between the head and arm, utilizing the same arm bearing surfaces to guide the head and to clamp it. This arrangement maintains the head and spindle in alignment whether the head is clamped or unclamped and imposes no force tending to inch the head from selected position as clamping pressure is imposed.

*Power operated head clamp*

Figure 5:
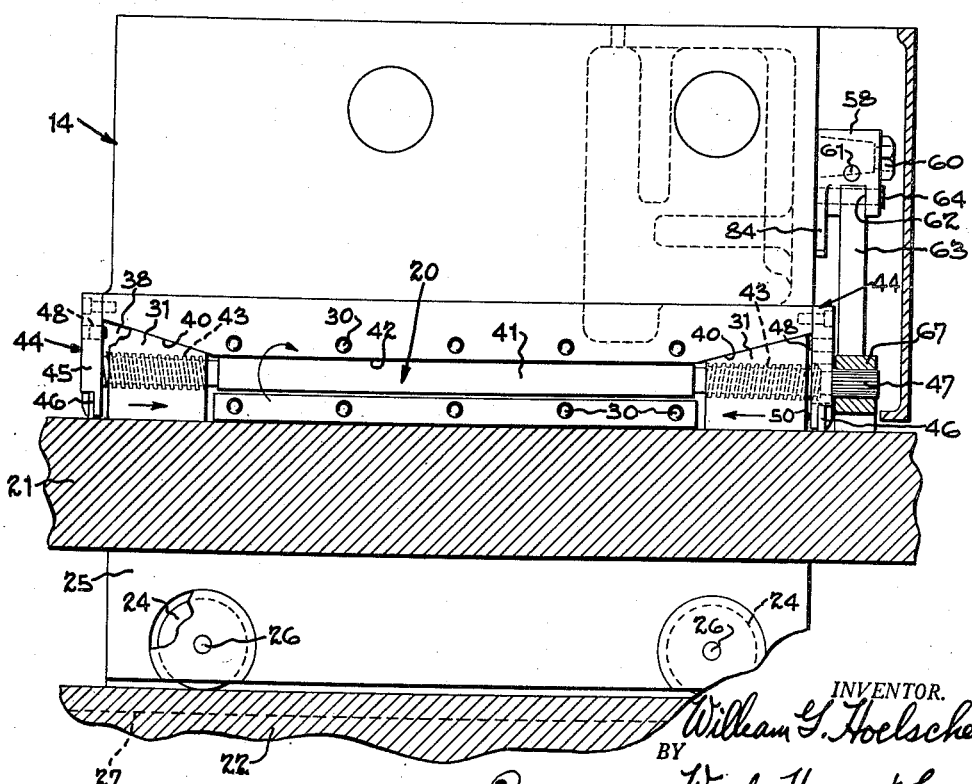
Figure 5 is a sectional view taken along line 5—5 of Figure 2, showing the clamping shoes in relation to the arm which carries the head.

As best shown in Figures 2 and 5, the arm 12 comprises a rigid cantilever section having an upper guide rail 21, a lower guide rail 22 and a longitudinal load bearing slot 23 disposed between the two guide rails. The head is supported upon a pair of anti-friction rollers 24—24 set in recesses formed in the tongue 25 interfitting the load bearing slot. The rollers are carried upon spindles 26 projecting from the head and rotatably journalling the rollers. The rollers track upon the upper surface of hardened way 27 set into the slot 23 and thus bear the weight load of the head. The rollers insure loss of head movement and reduce the effort of starting the head from a stationary position.

The head is stabilized laterally upon the upper guide rail 21 by a retainer bar 28 attached by bolts 30 and overhanging the side bearing surfaces of the upper guide rail 21. The head includes a bearing surface embracing the opposite side bearing surface of the guide rail, the two bearing side surfaces of the top rail thus being slidably embraced by the opposed bearing surfaces of the head. The retainer bar 28 also slidably confines the opposed wedging shoes 31—31 of the head clamp as noted later.

The lower portion of the head is stabilized laterally by the opposed side bearing surfaces of the lower guide rail 22. To adjust the head bearing surfaces precisely, a gib 32 slidably embraces the bottom bearing surface of the lower rail 22 and a second gib 33 slidably engages its side bearing surface. Each gib is tapered longitudinally and has a bearing surface parallel with the bottom and side bearing surfaces of the lower guide rail. The gibs are adjusted in a conventional manner by means of adjustment screws threaded into the head on opposite sides. The adjustment arrangement is not an essential part of the invention, and this structure has been omitted. It will be understood that the gibs are adjusted to provide a close running fit with the bearing surfaces of the lower rail.

It will be noted in Figure 2 that the head generally comprises the front section 34, which carries spindle 13 and clamping mechanism 20, and a rearward section 35, which includes certain components of the driving system. These two portions straddle the arm, such that the head is at least partially balanced on the load bearing rollers 24 and is stabilized laterally by the upper and lower side bearing surfaces. The head is shifted along the arm by a pinion 36 engaging a rack 37 extending along the arm.

As viewed from the rear in Figure 5, the clamping pressure is developed by the two opposed wedging shoes 31—31 which are set into recesses 38 at opposite sides of the head. The shoes have inclined upper surfaces 40 slidably engaging the corresponding top bearing surfaces of the recesses. As noted earlier, the shoes are slidably confined by the end portions of the retainer bar 28.

The wedging shoes are actuated by a rock shaft 41 residing loosely in a longitudinal shaft slot 42 formed in the head. The opposite ends of the rock shaft comprise right hand and left hand screw thread sections 43—43 threaded into corresponding bores of the wedging shoes 31—31. The shoes act as nuts and move toward or away from one another in response to partial rotation of shaft 41 in clamping and unclamping direction.

The top bearing surface of the upper guide rail 21 is machined to a smooth flat finish and, when unclamped, slidably supports the lower surface of the wedging shoes, with the weight load of the arm carried by the rollers 24, as indicated previously. The bottom gib 32 is adjusted to create a close running fit with the bottom surface of the lower rail 22, so as to impose a light downward thrust upon the head and rollers 24. The side bearing surfaces thus stabilize the head and maintain the precise axial alignment of the spindle, the rollers support the load, and the wedging shoes 31 slide loosely along the top guide rail surface as the head is shifted.

When the motor 18 is energized in clamping direction, the rock shaft 41 is rotated in the direction indicated by the arrow in Figure 2, thus drawing the clamping shoes toward one another as indicated. As the shoes move inwardly, their lower surfaces slide along the top bearing surface of the upper rail 21 and their oppositely inclined top surfaces 40 create a powerful upward wedging action against the inclined bearing surfaces of recesses 38, tending to lift the head. Although the lower gib 32 is precisely machined and adjusted, the upward force generated by the shoes is sufficiently powerful to take up the running clearance of the lower gib and to unload the rollers 24 which normally support the head. The upward motion of the head is slight; however, the rollers are actually lifted sufficiently from the tracking way 27 to be rotated freely when the head is clamped. Although the head is lifted slightly, the side bearing surfaces of the upper and lower guide rails preserves the original alignment of the axis of the spindle in the plane transverse to the arm. The alignment in the plane lengthwise of the arm is preserved by the bottom gib 32 against which the clamping pressure reacts. The clamping pressure thus acts in compression against the opposed bearing surfaces of the upper and lower guide rails.

During the drilling or machining operation, the spindle is fed downwardly at a feed rate which is related to its speed of rotation. As the tool penetrates the work, the downward pressure imposed by the spindle reacts directly against the bottom gib 32, and since the gib, or gibs, are clamped in compression against the bottom rail surface, the head is held firmly against any spindle deflection even under heavy resistance to downward spindle feed.

During the clamping motion, the opposed screw threaded sections 43 shift the shoes 31 at the same rate of motion toward one another. Since the shoes support the rock shaft, leaving the shaft free to float axially, the frictional resistance of one shoe reacts through the rock shaft to the other shoe. This self-neutralizing action of the shoes causes the head to remain precisely in its selected position as the clamping forces are imposed, and also applies equal pressure at opposite sides of the head to preserve spindle alignment. In other words, should the shoe on the left, as viewed in Figure 5, develop a greater resistance to motion than the right hand shoe, then the left hand shoe will remain stationary until the resistance is equalized by continued advance of the right hand shoe. This self-compensating action neutralizes any tendency to inch or displace the head and prevails until the final clamping pressure is reached, at which time both shoes create equal pressure against the top rail surface, thereby pulling the head under pressure upwardly against the bottom gib 32. Since the pressure is equal at opposite sides of the head, the original spindle alignment is preserved.

It will be noted in Figure 5, that the diameter of rock shaft 41 is less than the width of the slot 42 in which it resides. Accordingly, the shaft is free to float laterally as well as axially relative to the slot, the shaft being supported entirely by the clamping shoes which rest upon the top bearing surface. As indicated by the broken lines in Figure 2, the clamping shoes have a width equal to the width of the upper guide rail 21 and the head recesses 38 have a corresponding width to loosely confine the shoes. The bolts 30 of the retainer bar 28 are located on opposite sides of the slot and its endwise portions overlie the clamping shoes to confine them laterally, while the lower edge portion of the bar overhangs the top guide rail to provide the slide bearing engagement as noted earlier.

In order to keep the top bearing surface clean and thereby prevent any interference with the smooth equalizing action of the shoes, the head is provided with wipers 44 at opposite sides (Figure 5). Each wiper consists of a mounting plate 45 secured by screws to the head. The lower portion of each mounting plate includes a wiper strip 46 formed of felt or other suitable material in wiping contact with the top surface of guide rail 21. The lower portion of the head may include similar wipers (not shown) contacting the bottom surface of the lower guide rail.

It will be noted in Figure 5 that the end of the rock shaft projects through the right hand mounting plate 45, the plate being provided with a bore for this purpose. The projecting outer portion of the shaft comprises a knurled stub shaft 47, the actuating lever of the clamping mechanism being mounted on the stub shaft as explained later. The knurl is in the form of relatively fine longitudinal serrations or ridges which key the lever at a selected angle to the shaft.

Each of the wiper mounting plates 45 include an adjustment screw 48 (Figure 5) having an inner end contacting the outer end 50 of the clamping shoe. Accordingly, when the shoes are unclamped and the head is shifted along the arm, the floating shoe at the trailing side, in the direction of head movement, is engaged by its adjustment screw, thus shifting both shoes and the rock shaft in unison with the head. This prevents the leading clamp shoe from creating any wedging action impeding head movement. In other words, if the shoes were not confined endwisely but were free to float, then the leading shoe may tend to remain stationary and develop a wedging action against the inclined top surface of its recess.

*Clamp driving mechanism*

As best shown in Figure 2, the reversible clamp motor 18 is mounted on a vertical axis on the top wall 51 of the head by means of screws passing through its mounting flange 52 (Figure 4). The motor is enclosed by a motor casing mounted upon the top wall of the housing. The motor shaft includes a worm 53 meshing with a worm wheel 54 keyed to a horizontal shaft 55 journalled in anti-friction bearings mounted in the lug 56 and end wall 57 of the housing. The outer end of the horizontal shaft is tapered (Figure 2) and includes a crank 58 secured by a nut 60 and keyed in radial position by a taper pin 61 passing through the hub of the crank and across the shaft.

The swinging end of crank 58 is forked as at 62 (Figure 5) and a link 63 fits into the forked end and is connected thereto by a pivot pin 64. The pivot pin is locked in position by a clip secured to the face of the crank as shown in Figure 2.

The opposite end of link 63 is pivoted as at 65 to the forked end 66 of the clamp actuating lever 67 which is keyed to the knurled stub shaft 47 of rock shaft 41. The clamp lever is split as at 68 and a clamp screw 70 is threaded across the split portion and draws the split sections into clamping engagement with the knurled shaft. The fine serrations of the stub shaft permit the clamping lever to be rotated at assembly to the required radial position within the limits of movement of the motor driven crank 58.

The parts are shown in the drawings in clamped position, the clamp lever and rock shaft having been rotated in the direction shown by the arrows in Figures 2 and 5. As shown in Figure 2, a positive stop 71 engages the clamp lever 67 at its limit of clamping movement. The stop comprises a lug 72 having an adjustment screw 73 threaded through it and locked in adjusted position by the set screw 74. It will be understood that rotation of the motor shaft in unclamping direction rotates worm wheel 54 in a direction opposite to that indicated by the arrows, the unclamping force being applied in tension through the link 63, the clamping force being imposed in compression.

As noted earlier, the reversible motor 18 is controlled at the front of the head by push buttons mounted in the control box 17. The control box includes a clamp button and an unclamp button which are depressed momentarily to energize the motor in the required direction. The push buttons, as explained later with reference to Figure 11, complete the circuit to the motor which thereafter maintains its own circuit through two cam actuated pilot or limit switches 75 and 76. The clamping lever 67 is adjusted to rotate the clamp shaft to its limits and the pilot switches are arranged to deenergize the motor circuit at the clamping and unclamping limits.

The clamp actuating linkage and pilot switches are shown diagrammatically in Figure 6 for clarity. The pilot switches 75 and 76 are mounted on the wall of the head and are actuated in time with the clamping linkage by respective switch cams 77 and 78. The cams are clamped by bolts 80 to a cam sleeve 81 rotatably journalled on a stub shaft 82 projecting from the side wall of the head, as shown in Figures 3 and 4. The cam sleeve is represented by the shaft 81 in Figure 6.

The cams are rocked in unison by a gear sector 83 secured to the inner end of the cam sleeve 81 and meshing with a companion gear sector 84. Gear sector 84 forms a part of the crank 58 which is keyed to the worm wheel shaft, such that the cams are rocked in response to crank motion. The linkage is shown in clamping position in the several views.

The pilot switches are of conventional design and consist of a pair of fixed terminal blocks 85 mounted side by side upon a bracket 86 secured to the head. Each switch has a plunger 87 carrying a contactor which alternately engages the stationary contacts 88 of terminal blocks 85. The circuit is described later with reference to Figure 11; however, it will be understood at this point that the contactor of pilot switch 75 remains in the position shown in Figure 6 during the unclamping motion, the cams being rotated in the direction shown by the arrows. It is shifted down to the opposite position by the lobe 89 to decommission the motor when the mechanism is completely unclamped. On the other hand, the plunger of pilot switch 76 is shifted upwardly by the lobe 89 of its cam 78 as soon as the unclamping cycle is initiated.

Each switch plunger includes a roller 90 tracking against the respective cams 77 and 78. Each plunger is biased in the upward direction by a respective bell crank lever 91 pivoted in common upon a stub shaft 92 projecting from the head. The upper end of the bell crank levers are pivoted as at 93 to the switch plungers while their lower ends are connected to tension springs 94 anchored upon a pin 94a projecting from the head. The springs exert a constant tension on the levers, urging the switch plungers upwardly against the tracking surfaces of the switch cams.

The cams 77 and 78 are adjusted relative to the actuating linkage so as to close and open the switch contacts precisely at the clamping and unclamping limits so as to deenergize the motor automatically at the end of each cycle. At assembly, the cam screws 80, which traverse a split portion 95 of the cam hubs, are loosened to allow the cams to be rotated relative to one another upon their common sleeve 81. The cams are then set to bring their lobes to the plunger actuating positions as indicated in Figure 6 and the screws are tightened to clamp the cams to the sleeve.

Electrical circuit

The head clamp control circuit is shown in simplified form in Figure 11, with the switching contacts and relays in the clamped position corresponding to Figure 6. The control circuit is powered by the low voltage lines 96 and 97 and the clamp motor 18 is powered by the three phase power lines indicated at 99. The power is conducted to the head by a suspended cable and a transformer (not shown) steps down the voltage for the control circuit.

The reversible motor 18 is driven in forward and reverse directions by the reversing contacts in the power lines, the contacts being indicated as "clamp" and "unclamp." They are actuated by the clamp and unclamp relays in the branch lines 98 and 100 of the control circuit. The relays are energized by the clamp and unclamp push buttons interposed in the push button lines 98a and 100a. Each relay includes a normally open holding contact 101 in its branch line 98 or 100 shunting the push button. The clamp relay includes a normally closed interlock contact 102 in branch line 100 leading to the unclamp relay; the unclamp relay includes a similar interlocking contact 103 in line 98. The pilot switches 75 and 76 are also interposed in the branch lines 98 and 100, switch 75 being closed and switch 76 being open as in Figure 6.

When the unclamp push button is depressed, it closes the circuit from line 96, through branch line 100, through the closed contacts of pilot switch 75, through the closed interlock contact 102, and through the unclamp relay to line 97. Upon being energized, the unclamp relay closes its holding contact 101 in line 100 to keep the relay energized after the push button is released and also opens its interlock contact 103 in line 98 to prevent the clamp relay from being energized. The unclamp relay also closes the unclamp contacts of the power lines to drive the motor in unclamping direction.

As the motor begins to shift in unclamping direction as indicated in Figure 6, the high lobe 89 of cam 78 allows pilot switch 76 to close. However, since the closed interlock contact 103 in line 98 has been opened by the energized unclamp relay, the clamp relay remains deenergized. At the end of the unclamp cycle, the high lobe of cam 77 shifts pilot switch 75 to open position and thus deenergizes the unclamp relay. This opens the unclamp contacts of the power circuit to stop the motor. It will be seen that by reason of the open pilot switch 75, the motor remains deenergized and depressing the unclamp button has no effect on the apparatus.

When the clamp button is depressed, a circuit is completed to line 98, shunting the open holding contact 101 of the clamp relay. The circuit is completed through pilot switch 76 and through interlock contact 103 both of which were closed at the end of the unclamping cycle. As soon as the clamp relay is energized, it closes its holding contact 101, and opens its interlock contact 102 in line 100. The closed holding contact keeps the clamp relay energized after the clamp button is released. The clamp relay thus closes its clamp contacts in the power line so that the motor continues running in the clamping direction until the mechanism is fully clamped.

At the end of the clamp cycle, cam 78 shifts pilot switch 76 back to its open position shown in Figure 6. This deenergizes the clamp relay and opens the motor contacts and also opens the holding contact 101 in line 98 and closes its interlock contact 102 in line 100. Since pilot switch 75 and interlock contact 102 are now closed, the circuit is conditioned to again drive the motor in unclamping direction when the unclamp button is depressed.

The cams are timed with respect to the actuating linkage to deenergize the motor at a point when the shoes reach a preset pressure, with the arm contacting the positive stop 71. The self-locking action of the rock shaft and shoes clamps the head firmly while the motor remains deenergized. The pilot switches, by their timing prevent overloading and the attendant wear and damage to the parts and have the advantage of controlling the pressure in a positive manner for reliable operation.

*Hand operated clamp*

The modified structure shown in Figures 7 to 10 inclusive, represents a radial drill in which the head clamp is actuated manually instead of by power. As shown in Figure 8, the head is provided with a hand lever 104 for imparting rotary motion to the rock shaft 41. It will be noted in Figure 9, that the shaft includes a serrated end portion 105 projecting through the wiper plate 106, the hub 107 of the lever being keyed to the serrations and locked to the shaft by a set screw 108.

As shown in Figure 10, the opposite end of the shaft carries a detent sector 110 having a split portion 111 which is clamped to the shaft by a screw 112. A spring loaded detent lever 113 is pivoted upon a stub shaft 114 projecting from the end wall of the head and includes a detent roller 115 at one end and a tension spring 116 anchored as at 117 to the opposite end. The upper end of the spring is anchored to a pin 118 projecting from the end wall of the housing.

The tension spring urges the detent roller against the tracking surface of the sector which includes a pair of generally circular recesses 120—120. In the clamping position of the lever, as shown in full lines in Figure 8, the upper recess of the sector is presented to the roller, which by its spring pressure, creates a camming action to hold the clamp shaft and lever in clamped position. When the lever is shifted to its unclamped position, as shown in broken lines, the tracking surface of the swinging sector forces the detent roller outwardly and after the high intermediate portion of the sector advances beyond the roller, the spring loaded roller cams against the lower recesses, holding the shaft and hand lever in unclamping position. The detent action thus provides against accidental displacement of the lever from either of its positions.

The hand operated clamp, with the exception of the hand lever, is identical with the power operated structure and provides the same advantages. The wedging action of the shoes, combined with the screw thread motion allows the operator to clamp and unclamp the head without exerting a great deal of manual effort. The modified structure is intended particularly for machines not requiring frequent clamping and unclamping of the head, such as those used in production work.

Having described my invention, I claim:

1. A machine tool comprising a longitudinal support arm having a plurality of longitudinal bearing surfaces, a head slidably engaging said bearing surfaces and movable lineally along the arm, the head having a pair of opposed longitudinal wedging surfaces overlying one of the bearing surfaces of the arm, said wedging surfaces being disposed in the opposite endwise portions of the head in the direction of lineal movement of the head, said pair of wedging surfaces tapering from the outer ends thereof inwardly in opposite directions toward the bearing surface of the arm and spaced outwardly therefrom, a pair of opposed wedging shoes slidably interfitting the said wedging surfaces of the head and opposed bearing surface of the arm, said wedging shoes having opposed screw threads located on a common axis generally parallel to the direction of lineal head movement, a rock shaft having endwise portions threaded in opposite directions and engaging the said screw threads of the wedging shoes, said wedging shoes and rock shaft being free to float as a unit in the direction of lineal head motion, and actuating means connected to the rock shaft for rotating the same in clamping and unclamping directions, said rock shaft forcing said shoes simultaneously toward one another along the path of lineal head motion upon rotation in clamping direction, thereby providing a self-equalizing wedging force between the said bearing surface of the arm and wedging surfaces at the endwise portions of the head and clamping the head under equalized wedging force to the arm.

2. A machine tool comprising a longitudinal support arm having a plurality of flat parallel bearing surfaces extending longitudinally thereof, a head slidably engaging said flat bearing surfaces and movable lineally along the arm, a pair of opposed wedging shoes extending longitudinally in the direction of lineal head movement, said wedging shoes being tapered longitudinally in opposite directions, the head having a pair of opposed wedging surfaces which are oppositely tapered longitudinally to a degree corresponding to the taper of the opposed wedging shoes, the tapered surface of the wedging shoes slidably engaging the tapered wedging surfaces of the head, the wedging shoes having a flat surface opposite the tapered side thereof slidably engaging one of the flat bearing surfaces of the arm, and actuating means connected to the wedging shoes for shifting the same simultaneously in opposite directions relative to one another and along the path of lineal head movement, said wedging shoes and actuating means comprising an assembly which is free to float as a unit in the direction of lineal head movement, and stop means on the head located in a position to contact the assembled wedging shoes and actuating means for shifting the same in unison with the head upon lineal movement of the head, said actuating means creating a self-equalizing action between the wedging surfaces of the head and bearing surface of the arm upon being actuated in clamping direction, thereby to clamp the head to the arm without imposing forces tending to displace the head from a selected position.

3. A machine tool comprising a longitudinal support arm having a plurality of parallel bearing surfaces, a head slidably engaging said bearing surfaces and movable lineally along the arm, the head having a pair of opposed wedging surfaces overlying one of the bearing surfaces of the arm, said wedging surfaces being disposed in the opposite endwise portions of the head, in the direction of lineal movement of the head, said pair of wedging surfaces tapering longitudinally from the outer ends thereof inwardly in opposite directions toward the bearing surface of the arm and spaced outwardly therefrom, a pair of opposed slidable wedging shoes interfitting the overlying surfaces of the head and arm, a rock shaft having right hand and left hand screw threads interconnecting the opposed wedging shoes, said wedging shoes and rock shaft being free to float as a unit in the direction of lineal head motion, stop means on the head located to engage the outer end portions of the opposed wedging shoes, said stop means contacting the shoe on the trailing side in the direction of lineal head movement and thereby shifting the wedging shoes and rock shaft as a unit with the head upon lineal head movement, and actuating means connected to the rock shaft for rotating the same in clamping and unclamping directions, said rock shaft forcing said shoes simultaneously toward one another and along the path of lineal head movement upon rotation in clamping direction, thereby providing a self-equalizing wedging force between the bearing surfaces of the head and arm and clamping the arm under equalized wedging force to the arm.

4. A machine tool comprising a longitudinal support arm having a plurality of parallel bearing surfaces, a head slidably engaging said bearing surfaces and movable lineally along the arm, the head having a pair of recesses in one side thereof having opposed wedging surfaces overlying one of the bearing surfaces of the arm, said wedging surfaces being disposed in the opposite endwise portions of the head in the direction of lineal movement thereof, said pair of wedging surfaces tapering from the outer ends thereof inwardly in opposite directions toward the bearing surface of the arm and spaced outwardly therefrom a pair of opposed wedging elements slidably interposed between the spaced wedging and bearing surface, a longitudinal passageway in the side of the head communicating with the said recess, a rock shaft loosely confined in said passageway and having opposed screw threads engaging the wedging elements, said wedging elements and rock shaft being free to float as a unit in the direction of head motion, a closure element secured to the side of the head, overlying said slot and recesses and loosely confining the wedging shoes and rock shaft therein, said closure element having a portion slidably engaging one of the bearing surfaces of the arm and guiding the head for movement lineally along the arm, and actuating means connected to the rock shaft for rotating the same in clamping and unclamping directions, said rock shaft forcing said shoes simultaneously toward one another along the path of lineal head movement upon rotation in clamping direction, thereby providing a self-equalizing wedging force between the surfaces of the head and arm and clamping the head under equalized pressure to the arm.

5. A machine tool comprising a longitudinal support arm having a plurality of parallel bearing surfaces, a head slidably engaging said bearing surfaces and movable lineally along the arm, said head having a pair of wedging surfaces spaced apart from one another and extending longitudinally in the direction of lineal head movement, said wedging surfaces being tapered longitudinally in relatively opposite directions and being spaced outwardly from one of the arm bearing surfaces, a pair of tapered wedging shoes slidably engaged between said tapered wedging surfaces and the adjacent arm bearing surface, a rock shaft connected to said shoes for shifting the same simultaneously in opposite directions upon rotation of said shaft in clamping and unclamping directions, said wedging shoes and rock shaft being free to float in the direction of lineal head movement, thereby to provide a self-equalizing wedging action when shifted in clamping direction, a reversible clamping motor connected to the rock shaft, a power source including manual control means connected to the motor for driving the motor and rock shaft in clamping and unclamping directions, and pilot means in driving connection with the motor, said pilot means interconnected with the said power means and deenergizing the motor at predetermined limits of motion in clamping and unclamping directions independently of manual control means.

6. A machine tool comprising a longitudinal support arm having a plurality of parallel bearing surfaces, a head slidably engaging said bearing surfaces and movable lineally along the arm, said head having a pair of wedging surfaces spaced apart from one another and extending longitudinally in the direction of lineal movement, said wedging surfaces being tapered longitudinally in relatively opposite directions, and being spaced outwardly from one of the arm bearing surfaces, a pair of tapered wedging elements slidably engaged between said tapered wedging surfaces and the adjacent arm bearing surface, a rock shaft connected to said elements for shifting the same simultaneously in opposite directions upon rotation of said shaft in clamping and unclamping directions, said wedging elements and rock shaft being free to float in the direction of lineal head movement, thereby to provide a self-equalizing wedging action when shifted in clamping direction, a reversible power motor, a driving system connecting the motor to the rock shaft, a manually controlled power source connected to the motor for driving the motor and rock shaft in clamping and unclamping directions, a pilot control element interconnected with the power source and arranged to deenergize the motor independently of the manual control means, a cam element connected to the driving system of the motor and in driving connection with the pilot element, the cam element shifting the pilot element to a position deenergizing the motor at a predetermined limit of motion in clamping direction.

7. A machine tool comprising a longitudinal support arm having a plurality of parallel bearing surfaces, a head slidably engaging said bearing surfaces and movable lineally along the arm, said head having a pair of wedging surfaces spaced apart from one another and extending longitudinally in the direction of lineal head movement, said wedging surfaces being tapered longitudinally in relatively opposite directions and being spaced outwardly from one of the arm bearing surfaces, a pair of tapered wedging elements slidably engaged between said tapered wedging surfaces and the adjacent arm bearing surface, a rock shaft connected to said elements for shifting the same in opposite directions upon rotation of said shaft in clamping and unclamping directions, said wedging elements and rock shaft being free to float in the direction of lineal head movement, thereby to provide a self-equalizing wedging action when shifted in clamping direction, a reversible power motor, a driving system connecting the motor to the rock shaft, a power source including manual control means for driving the motor and rock shaft in clamping and unclamping directions, a pair of pilot elements interconnected in the power source and arranged to deenergize the motor independently of the said manual control means, a first and second cam element connected to the driving system and in driving connection with the respective pilot elements, said first cam element shifting one of the pilot elements to a position deenergizing the motor at a predetermined limit of motion in clamping direction, and the second cam element shifting the other pilot element to a position deenergizing the motor at a predetermined limit of motion in unclamping direction.

8. A machine tool comprising a longitudinal support arm having a plurality of parallel bearing surfaces, a head slidably engaging said bearing surfaces and movable lineally along the arm, the head having a pair of opposed longitudinal wedging surfaces overlying one of the bearing surfaces of the arm, said pair of wedging surfaces tapering in opposite directions relative to the said bearing surface of the arm and spaced outwardly therefrom, a pair of opposed tapered wedging elements slidably interfitting the said wedging and bearing surfaces, a rock shaft having right hand and left hand screw threads in threaded engagement with the wedging elements, said wedging elements and rock shaft being free to float as a unit in the direction of lineal head motion, a reversible power motor connected to the rock shaft, a power source connected to the motor and including manually operated control means for driving the motor and rock shaft in clamping and unclamping directions, said rock shaft forcing said wedging elements lineally relative to one another upon rotation of the shaft in clamping direction and creating a self-equalizing wedging force between the wedging and bearing surfaces of the head and arm, thereby clamping the head under equalized pressure to the arm, said screw threads and tapered wedging elements creating a self-locking action which retains the clamping pressure initially imparted by the motor, adapting the motor to be deenergized without releasing the clamping pressure.

9. A machine tool comprising a longitudinal support arm having a plurality of longitudinal bearing surfaces, a head slidably engaging said bearing surfaces and movable lineally along the arm, the head having a pair of opposed wedging surfaces overlying one of the bearing surfaces of the arm, said pair of wedging surfaces tapering longitudinally in opposite directions relative to the said bearing surface of the arm and spaced outwardly therefrom, a pair of opposed tapered wedging elements interposed between the said wedging and bearing surfaces, a rock shaft having right hand and left hand screw threads in threaded engagement with the wedging elements, said wedging elements and rock shaft being free to float as a unit in the direction of lineal motion, a reversible power motor connected to the rock shaft, a power source including manually operated control means connected to the motor for driving the motor and rock shaft in clamping direction, and pilot means in driving connection with the motor, said pilot means interconnected with the said power source and deenergizing the motor at a predetermined limit of motion in clamping direction independently of the manually operated control means, said rock shaft forcing said wedging elements relative to one another upon rotation of the shaft in clamping direction and creating a self-equalizing wedging force between the spaced surfaces of the head and arm, thereby clamping the head under equalized pressure to the arm, said screw threads and tapered wedging elements creating a self-locking action which retains the clamping pressure initially imparted by the motor, adapting the motor to be deenergized without releasing the clamping pressure.

10. A machine tool comprising a longitudinal support arm having a plurality of longitudinal bearing surfaces, a head slidably engaging said bearing surfaces and movable lineally along the arm, the head having a pair of opposed wedging surfaces overlying one of the bearing surfaces of the arm, said pair of wedging surfaces tapering longitudinally in opposite directions relative to the said bearing surface of the arm and spaced outwardly therefrom, a pair of opposed wedging elements interposed between the said wedging and bearing surfaces, a rock shaft having right hand and left hand screw threads in threaded engagement with the wedging elements, said wedging elements and rock shaft being free to float as a unit in the direction of lineal head motion, a reversible power motor, a driving system connecting the motor to the rock shaft, a power source including manual control means for connection to the motor for driving the motor and rock shaft in clamping and unclamping directions, a pair of pilot elements interconnected in the power source and arranged to deenergize the motor independently of the said manual control means, and a pair of cam elements connected to the driving system and in driving connection with the respective pilot elements, said cam elements shifting one of the pilot elements and deenergizing the motor at a predetermined limit of motion in unclamping direction, the other of said cams shifting the other pilot element to a position deenergizing the motor at a predetermined limit of motion in clamping direction, said rock shaft forcing said wedging elements relative to one another upon rotation of the shaft in clamping direction and creating a self-equalizing wedging force between the spaced surfaces of the head and arm, thereby clamping the head under equalized pressure to the arm, said screw threads and tapered wedging elements creating a self-locking action which retains the clamping pressure initially imparted by the motor, adapting the motor to be deenergized by the pilot element without releasing the clamping pressure.

References Cited in the file of this patent
FOREIGN PATENTS

| | | |
|---|---|---|
| 1,015,550 | France | Aug. 6, 1952 |